United States Patent [19]

Seliga, Gerald W.

[11] 3,946,513

[45] Mar. 30, 1976

[54] FISHING LURE

[75] Inventor: Seliga, Gerald W., Frankfort, Ill.

[73] Assignee: G & S Industries, Inc., Oak Forest, Ill.

[22] Filed: Dec. 20, 1974

[21] Appl. No.: 534,872

[52] U.S. Cl. ............................................. 43/42.5
[51] Int. Cl.² ........................................ A01K 85/00
[58] Field of Search ........................... 43/42.5, 42.22

[56] References Cited
UNITED STATES PATENTS

| | | | |
|---|---|---|---|
| 1,031,149 | 7/1912 | Royer | 43/42 |
| 2,134,330 | 10/1938 | Fink | 43/42.22 |
| 2,774,170 | 12/1956 | Baker | 43/42.5 |
| 2,795,075 | 6/1957 | Christian | 43/42.22 |

*Primary Examiner*—Hugh R. Chamblee
*Assistant Examiner*—Daniel J. Leach
*Attorney, Agent, or Firm*—Wegner, Stellman, McCord, Wiles & Wood

[57] ABSTRACT

A subsurface fishing lure having a generally oval body of flat sheet material which extends longitudinally and resembles a minnow silhouette. A head portion of the body has an eyelet for attaching a leader with a fishing line. A concave disc is transversely mounted on the head portion just behind the fishing line eyelet. A tail portion of the body is divided into an enlarged upper portion and a smaller lower portion. The lower portion of the tail has an eyelet for attaching a hook. A longitudinal axis of the body bisects the line and hook eyelets. A rearward portion of the body including the tail slopes upwardly from the longitudinal axis to position the enlarged upper portion of the tail above the turbulent flow of water which is caused by the interaction of the disc and water as the lure is drawn through the water during retrieval. The concave disc, body and upper tail portion combine to provide several different actions of a live minnow swimming through the water by varying the speed in which the lure is retrieved.

17 Claims, 10 Drawing Figures

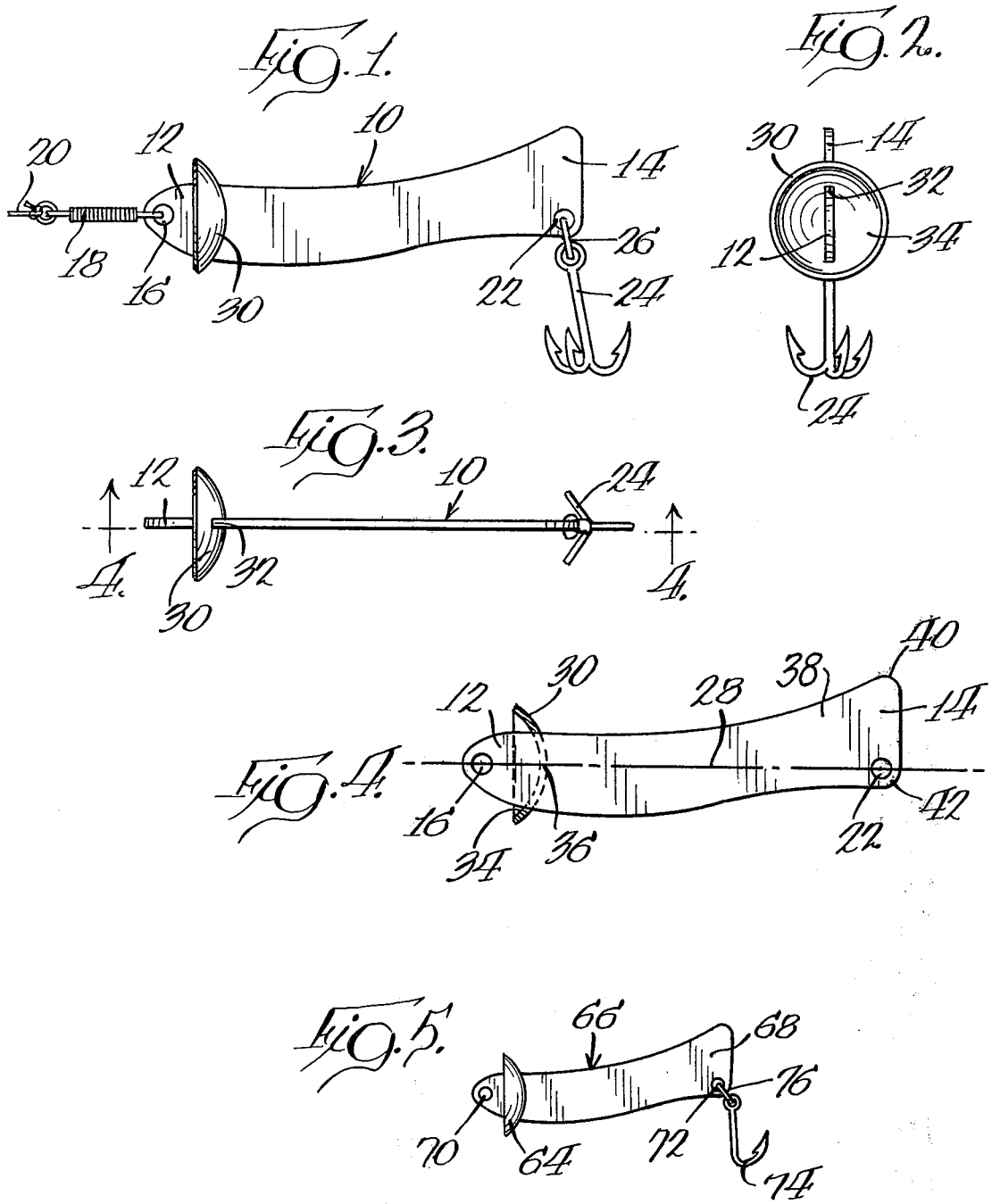

U.S. Patent  March 30, 1976  Sheet 2 of 2  3,946,513
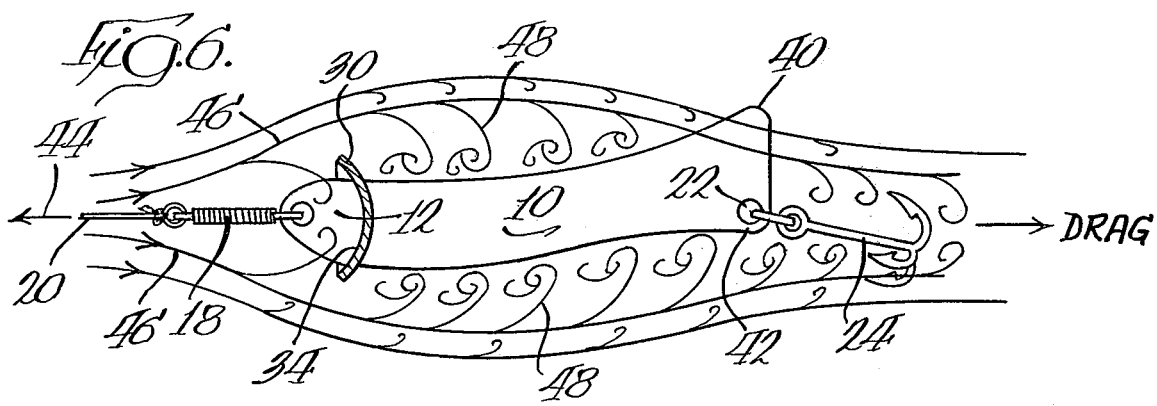
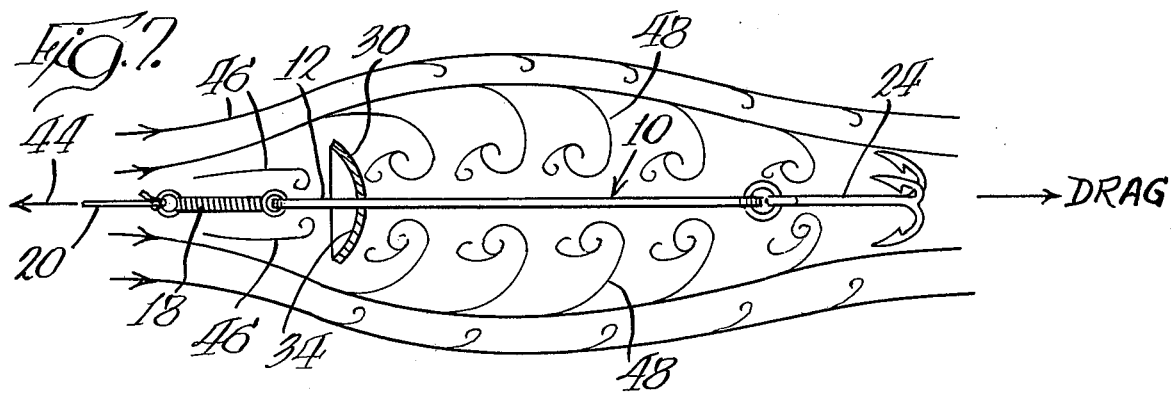
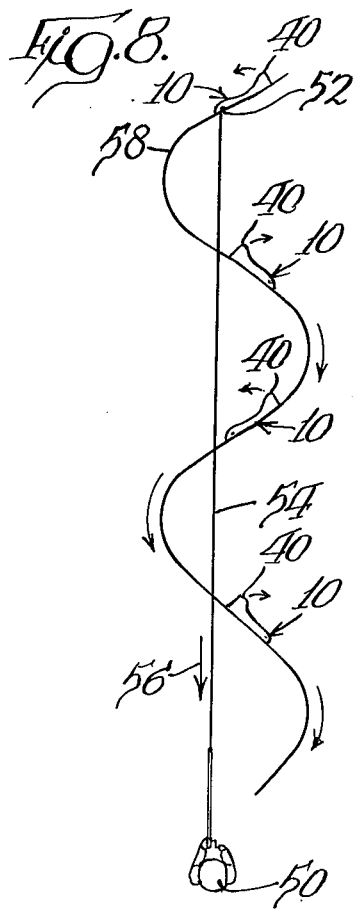
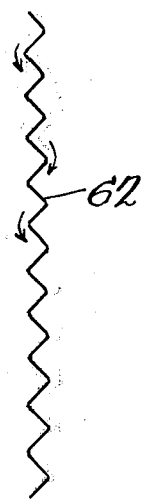

3,946,513

FISHING LURE

BACKGROUND OF THE INVENTION

This invention relates to the action of a subsurface fishing lure which simulates the movement of a minnow swimming through the water.

The desirability of an artificial lure of this type which can simulate a minnow with an oscillating tail along with a zigzagging and wiggling action of the body has long been recognized. Representative prior art includes Royer U.S. Pat. No. 1,031,149, Haas U.S. Pat. No. 2,008,250 and Keeler U.S. Pat. No. 2,561,515.

An early attempt to simulate the appearance and action of a minnow is illustrated by the fishing lure of Royer U.S. Pat. No. 1,031,149. This lure is cut from a flat sheet material in the silhouette of a minnow. A fishing line is attached to the front end and a hook trails from the rear end of the lure. However, this lure, although it may look like a minnow, lacks the action of a minnow and it simply spins through the water without the zigzag or wiggling action of the body or the oscillations of the tail.

Next, Haas U.S. Pat. No. 2,008,250 developed an action attachment to fit any conventional lure. The attachment consists of a semicylindrical plate of transparent material with a weight connected to the bottom of the plate. The weight coacts with the concavity and forward inclination of the plate when mounted on the front tip of the lure to cause the lure to assume a downward direction during retrieval and to maintain an upright position in the water. The semicylindrical plate attachment eliminates the spinning effect of Royer, but a further test of the lure shows that the lure action is limited to a downwardly bucking motion of the body.

More recently, Keeler U.S. Pat. No. 2,561,515 proposed a minnow-shaped lure of a flat sheet material with a directing plate mounted on the front tip of the head and a stabilizing plate mounted on the upper part of the tail. The stabilizing plate on the tail produces a bucking motion similar to Haas, and the angle of the directing plate on the nose allows the lure to achieve a greater depth when the line is being reeled in after casting.

None of these proposals, however, shows a subsurface fishing lure which simulates the natural actions of a minnow.

SUMMARY OF THE INVENTION

It is the primary object of the present invention to provide a subsurface fishing lure which closely simulates several of the natural actions of a minnow.

Another object of the invention is to provide a subsurface fishing lure which can switch between the several different actions of a minnow swimming through the water by varying the speed of retrievel when reeling in the lure.

A further object of the invention is to provide a subsurface fishing lure which can be mass-produced and yet maintains the critical portions between its two-piece construction to achieve the several different actions of a minnow because the parts of each lure are molded or stamped, which results in uniformity of size and shape as well as uniformity in performance.

A still further object of this invention is to provide a subsurface fishing lure which can be made in a variety of sizes for catching fish of different sizes by proportionately increasing or decreasing the size of its two-piece construction without losing the several different actions of a minnow.

In accordance with the present invention, a subsurface fishing lure that simulates the natural actions of a minnow has a generally oval body of flat sheet material which extends longitudinally in a shape of a minnow silhouette. The body includes a head portion with an eyelet for attaching a fishing line and a tail portion with an eyelet for attaching a hook. A longitudinal axis of the body bisects the line and hook eyelet. A concave disc is transversely mounted on the head at generally right angles to the longitudinal axis of the body. A central axis of the disc corresponds to the longitudinal axis of the body. The concave side of the disc faces toward the line eyelet on the head and toward the oncoming flow of water during retrieval. The tail is divided into an enlarged upper portion and a smaller lower portion. A rearward portion of the body including the tail slopes upwardly from the central axis of the disc to position the upper tail portion above the turbulent flow of water which is caused by the interaction of the disc and water as the lure is drawn through the water by a line attached to the head.

According to a further feature of the invention, the lower portion of the tail has a hook eyelet and is smaller than the upper tail portion so that only the upper tail portion is outside the eddy currents from the disc at the various speeds of retrieval. The interaction of the water on the upper tail portion and the concave disc stabilizes the lure in a generally upright position and prevents the lure from spinning in a circle when retrieved. The trailing hook from the lower tail portion has a drag to also keep the lure in a generally upright position during retrieval to complement the effect of the concave disc. The upwardly sloping rearward portion of the lure causes more flat sheet material to be above the longitudinal axis of the body than below, which results in the lure being top-heavy. The top-heaviness causes the lure to be unstable so that the upper tail portion leans from side to side when the lure is drawn through the water. The drag from the trailing hook combines with the unstable condition of the lure to make the hook eyelet a pivotal point upon which the upper tail portion oscillates in an arc.

In another feature of the invention, the action of the lure which simulates the natural actions of a minnow, depends upon the speed of retrieval. For instance, at a slow speed of retrieval, the lure moves through the water in a sinusoidal path about the axis of retrieval with the upper tail portion oscillating at a slow frequency in a wide arc. At a moderate speed of retrieval, the lure follows a zigzag path about the axis of the retrieval with the upper tail portion oscillating at a moderate frequency in a small arc. Finally, at a top speed of retrieval, the lure moves through the water in a wiggling path with the upper tail portion oscillating at a fast frequency in a smaller arc. Moreover, the weight of the disc on the head makes the lure nosedive when the speed of retrieval is slackened for achieving a greater depth in the water.

In still another feature of the invention, the concave side of the disc faces the oncoming flow of water and directs the water off the concave surface onto both sides of the head portion. This water buffets the head portion which tends to pivot the body into a zigzagging movement of a minnow, whereas a flat disc or plate creates only a water turbulence and a severe drag that destroys the desirable zigzag action.

In one embodiment of the invention, a subsurface fishing lure with the several different actions of a minnow includes a generally oval body of a flat sheet material which extends longitudinally in the shape of a minnow silhouette of approximately 3-5/16 inches in length, and 1/16 inch in width. The head portion of the body has a line eyelet of 3/16 inch in diameter, which is approximately 1/16 inch from the outer edge of the head portion. The tail portion of the body is 13/16 inch in height with a hook eyelet of 3/16 inch in diameter, which is located in the lower portion of the tail approximately 1/16 inch from its rounded outer edge at the bottom of the tail. A longitudinal axis of the body bisects the line and hook eyelets which places 11/16 inch of the tail above the longitudinal axis. A concave disc which is approximately 7/8 inch in diameter and has a concave depth of approximately 3/16 inch includes a diametrical slot of approximately 1/16 inch in width and 9/16 inch in height which matches the head portion to be mounted. The head portion passes through the diametrical slot so that the concave disc is transversely mounted at generally right angles to the longitudinal axis of the body and the concavity of the disc faces toward the line eyelet with the outer edge of the disc located approximately ⅜ inch from the front end of the lure and ⅛ inch from the line eyelet. The side elevation of the body from the convex side of the disc to the end of the tail ranges from ⅝ inch to 13/16 inch in height and 2¾ inch in length. The hook eyelet accommodates a No. 2 treble hook which freely trails approximately 1-1/16 inch behind the tail. The total weight of the lure is about 0.4 oz., or approximately 11 to 12 grams.

In addition to the above measurements of a preferred embodiment of the invention, the size of the lure can be increased or decreased proportionately according to the game fish the sportsman wants to catch without losing the several different actions of a minnow previously mentioned.

Preferably, all lures made according to the invention are chrome-plated to reflect light in the water so that fish are attracted to the lure.

Other objects and advantages of the invention will become apparent in the following specification taken in connection with the accompanying drawings.

DESCRIPTION OF THE DRAWINGS

FIG. 1 is an elevation of a fishing lure embodying the invention;

FIG. 2 is a front end view thereof;

FIG. 3 is a plan view thereof;

FIG. 4 is a side view thereof with the disc in section, illustrating the relation of the central axis of the disc to the longitudinal axis of the body;

FIG. 5 is a view similar to FIG. 1 of a smaller version thereof;

FIG. 6 is an elevation thereof, illustrating the turbulent flow of water from the disc;

FIG. 7 is a plan view thereof, illustrating the relationship of the turbulent flow of water buffeting the head portion;

FIG. 8 is a schematic of the lure action at a slow speed of retrieval;

FIG. 9 is a schematic of the lure action at a moderate speed of retrieval; and

FIG. 10 is a schematic of the lure action at a high speed of retrieval.

DESCRIPTION OF THE PREFERRED EMBODIMENT

One embodiment of the subsurface fishing lure with an improved zigzagging and wiggling action made according to the invention is illustrated in FIG. 1 and includes a body 10 of a flat sheet material extending longitudinally in the shape of a minnow silhouette with a uniform thickness. The body 10 includes a head portion 12 and a tail portion 14. The head portion 12 ranges to approximately 9/16 inch in height and further includes an eyelet 16 which is located 1/16 inch from the rounded outer edge of the lure 10 to secure a leader 18 for attachment of a fishing line 20 to draw the lure through the water. The tail portion 14 is approximately 13/16 inch in total height and further includes an eyelet 22, as best seen in FIGS. 1 and 4, for attachment of a hook 24, which in the larger forms of the lure is a treble hook. The hook 24 is connected to a split ring 26 which is connected to the hook eyelet 22. Alternatively, the hook 24 may be directly connected to the hook eyelet 22 by means of a hook with an adjustable eye. A longitudinal axis 28 of the body 10 bisects the line and hook eyelets 16 and 22, respectively, as seen in FIG. 4, which places 11/16 inch of the tail above the axis 28.

A concave disc 30 is transversely mounted on the head portion 12 at generally right angles to the longitudinal axis 28 of the body 10. Disc mounting is accomplished by means of a diametrical slot 32, as best shown in FIG. 3, which is cut into the disc 30, and the head portion 12 of the body 10 passes through the slot 32. The disc 30 is aligned on the head portion 12 at a predetermined distance of approximately ⅜ inch from the front tip of the body 10 and is secured in the previously mentioned position with respect to the longitudinal axis 28 by suitable means as soldering or spot welding.

The concavity 34 of the disc 30 faces toward the line eyelet 16 and the right angle positioning of the disc 30 with respect to the longitudinal axis 28 of the body 10 makes the central axis 36 of disc 30 correspond with the longitudinal axis 28 of the body 10.

In FIG. 4, the rearward portion 38 of the body slopes upwardly from the longitudinal axis 28 and terminates in an enlarged upper tail portion 40. The lower portion 42 of the tail 14 is rounded, and is much smaller than the upper tail portion 40. The hook eyelet 22 is located in the lower tail portion 42 approximately 1/16 inch from the round outer edge on the bottom of the tail 14. As a result of the upwardly sloping rearward portion 38 of the body 10 along with the enlarged upper tail portion 40 and the smaller lower tail portion 42 with eyelet 22, there is more sheet material above the longitudinal axis 28 than below which causes the lure 10 to be slightly top-heavy.

Preferably, the lure 10 in FIG. 1 has the following ratios: the diameter of the disc 30 to its concavity — 4.7:1; the body length behind the disc to the body length in front of the disc — 7.3:1; the body length of the lure 10 to the diameter of the disc 30 – 3.1:1; the body height to the diameter of the disc 30 – 0.93:1.

In operation, the fishing line 20 is attached to the leader 18, in turn connected to the line eyelet 16 and the head portion 12 to pull the lure 10 through the water, as seen in FIGS. 6 and 7. The direction in which the lure moves through the water is illustrated by arrow 44. As the lure 10 is drawn through the water, the concave side 34 of the disc 30 faces the oncoming flow of water 46. The interaction of the water 46 on the disc 30 causes eddy current 48 to envelop the entire body length behind the disc 30 except for the enlarged upper tail portion 40. The flow of water 46 is also directed off the concave surface of the disc 30 to buffet the head portion 12, as seen in FIG. 7. The buffeting of the head portion 12 coacts with the upper tail portion 40 which is positioned above the turbulent flow of water 46 and the upper tail portion 40 tends to lean from one side to the other during retrieval because of the top-heaviness of the lure 10 to produce the different minnow actions which are a function of the speed of the lure 10 through the water.

Moreover, as the lure 10 is drawn through the water, the concave disc 30 has a drag which tends to stabilize the lure 10 in a generally upright position, and to produce a path of retrieval parallel to the surface of the water.

The disc 30 and the upper tail portion 40 also coact to prevent the lure from spinning in a circle during retrieval. The hook 24 which trails from the hook eyelet 22 of the lower tail portion 42 adds a further drag feature that makes the hook eyelet 22 the pivotal point upon which the upper tail portion 40 oscillates. The arc in which the upper tail portion 40 oscillates is also a function of retrieval speed.

Accordingly, as the lure 10 is drawn through the water at different speeds of retrieval, a different action is produced at each speed of retrieval. Also, the path of the lure 10 through the water changes along with the arc and frequency in which the upper tail portion 40 oscillates.

In FIG. 8, the fisherman 50 casts the lure 10 to a point 52 in a body of water such as a pond, and begins to reel in the lure 10 at a slow speed of retrieval. When the fishing lure is at point 52 in the water, fishing line 20 is seen to form an axis 54 in the direction 56 in which the lure 10 will be retrieved. During retrieval, the lure 10 moves through the water at a particular depth which is generally parallel with respect to the surface of the water. While moving through the water at a depth parallel to the surface, the upper tail portion 40 leans from one side to the other. In conjunction with the tail movement, the lure 10 moves through the water in a sinusoidal path 58 about the axis 54 of retrieval with the upper tail portion 40 oscillating at a slow frequency in a wide arc.

In FIG. 9, the fisherman is reeling in the lure 10 at an intermediate speed of retrieval. In this instance, the lure 10 follows a pronounced zigzag path 60 through the water with the upper tail portion 40 oscillating at a moderate frequency in an arc which is smaller than the arc at the slower speed of retrieval.

In FIG. 10, the fisherman is reeling in the lure 10 at a fast speed of retrieval. This causes the lure 10 to move through the water in a wiggling path 62 with the upper tail portion 40 oscillating at a higher frequency and a smaller arc than the arc at the moderate speed of retrieval.

In addition, if the reeling is sharply slackened or stopped, the weight of the disc 30 results in the lure nosediving to a greater depth until a steady retrieval causes the lure 10 to level out at the desirable depth and to resume either a sinusoidal, zigzagging or wiggling action of a minnow swimming through the water.

FIG. 5 shows a smaller version of the lure 10 for catching smaller fish. A disc 64 maintains the same proportion, alignment, and longitudinal placement with respect to a body 66 when compared to the disc 30 in body 10 of the lure of FIG. 1. The size of the tail 68, line eyelet 70 and the size of hook eyelet 72 are likewise reduced proportionately with respect to the body 66 and the disc 64. The treble hook 24 of FIG. 1 is replaced by a single hook 74 on a split ring 76. The fish lure 66 in FIG. 5 maintains all of the functional characteristics such as the ratio between the disc and body, including the weight distribution of the lure 10 as described above.

The fish lure 66 moves through the water at the different speeds of retrieval with substantially the same action as the fish lure 10.

I claim:
1. A subsurface fishing lure comprising:
   a generally oval body of flat sheet material, said body extending longitudinally in the general shape of a fish silhouette with a rearward portion sloping upwardly, said body having a head with means for attaching a line, and a tail with means for attaching a hook; and
   a dish-shaped disc transversely mounted on said head with its concave side facing the forward end of said body, said disc being positioned on said body whereby the upper portion of the tail is above the turbulent flow of water caused by the interaction of the disc and water as the lure is drawn through the water by a line attached to the head.

2. The subsurface fishing lure of claim 1, in which the diameter of the disc to the concavity of the disc is approximately defined by the ratio 5:1.

3. The subsurface fishing lure of claim 1, in which the body length behind the disc to the body length in front of the disc is approximately defined by the ratio 7:1.

4. The subsurface fishing lure of claim 1, in which the body length of the lure to the diameter of the disc is approximately defined by the ratio 3:1.

5. The subsurface fishing lure of claim 1, in which the point on the body of the greatest height to the diameter of the disc is defined by the ratio 0.93:1.

6. A subsurface fishing lure for simulating the different actions of a fish swimming through the water, comprising:
   a generally oval body of flat sheet material in the shape of a fish silhouette, said body having a head portion with an eyelet for attaching a fishing line and a tail portion with an eyelet for attaching a hook, said tail having an enlarged upper portion and a rounded lower portion with said hook eyelet, said body having a longitudinal axis bisecting said line and hook eyelets;
   a concave disc mounted transversely on said head portion at generally right angles to said longitudinal axis so that the central axis of the disc corresponds with the longitudinal axis of the body, said disc having its concave side facing the oncoming flow of water during retrieval, a rearward portion of said body including said tail portion sloping upwardly from said longitudinal axis whereby said upper tail portion is positioned above the turbulent flow of water caused by the interaction of the disc and water as the lure is drawn through the water by a line attached to the head so that the disc and upper tail portion are able to coact for producing several different actions of a fish by varying the speed of retrieval.

7. The subsurface fishing lure of claim 6, wherein said body is 3-5/16 inches in length having a thickness of 1/16 inch, a line eyelet of 3/16 inch in diameter with a leader attached to the eyelet, a hook eyelet of 3/16 inch diameter with a No. 2 size treble hook attached directly to said eyelet.

8. The subsurface fishing lure of claim 7, wherein said disc is ⅞ inch in diameter with a concavity of 3/16 inch including a diametrical slot of 9/16 inch in length and approximately 1/16 inch in width, said body passing through said diametrical slot so that the outer edge of said disc is located ⅝ inch from the front end of the lure and ⅛ inch from said line eyelet.

9. The subsurface fishing lure of claim 8, wherein said body ranges in height from ⅝ inch to 13/16 inch behind said disc to the end of the tail.

10. The subsurface fishing lure of claim 9, wherein said tail portion is 13/16 inch in height and 11/16 inch of the tail portion is above the longitudinal axis which bisects said line and hook eyelets.

11. The subsurface fishing lure of claim 10 in which said lure is approximately 0.4 oz. or approximately 11 to 12 gms. in weight.

12. The subsurface fishing lure of claim 11 in which said hook trails freely from the hook eyelet on the lower portion of the tail at approximately 1-1/16 inches from the tail when the fishing lure is pulled through the water.

13. A fish lure of a subsurface type for simulating the natural action of a minnow swimming through the water, comprising:
   a generally oval body of a flat sheet material in a silhouette of a minnow having a head with means for attaching a line, a tail with means for attaching a hook; and
   a concave disc transversely mounted on said head by means of a diametrical slot in said disc to allow said head to pass through said slot, said disc generally mounted on said head at right angles to a longitudinal axis bisecting the line and hook attachment means, said disc having a central axis corresponding to said longitudinal axis and having its concave side facing the foward end of said lure, a rearward portion of said body sloping upwardly from the central axis and terminating in an enlarged upper tail portion whereby the upper tail portion is positioned above the eddy currents caused by the interaction of the disc and the water for providing several actions of a minnow which are determined by the speed of retrieval.

14. The method of simulating the different actions of a fish swimming through the water by using a subsurface fishing lure, said lure including a generally oval body of flat sheet material extending longitudinally in a minnow silhouette having a head with an eyelet for attaching a fishing line, a tail with an eyelet at the bottom for attaching a hook, said tail having an upper portion larger than a rounded lower portion, a longitudinal axis of said body bisecting said line and hook eyelets, a rearward portion of said body including the tail sloping upwardly with respect to said longitudinal axis, said lure further including a concave disc having a diametrical slot equal to the height and width of the head on said body, said disc transversely mounted on said body at generally right angles to said longitudinal axis with a proportion of said head passing through said diametrical slot up to a distance just past said line eyelet, said disc being positioned on said body so that the upper tail portion is above the turbulent flow of water caused by the interaction of the disc and water as the lure moves through the water during retrieval, which comprises
   retrieving said lure and varying the speed of retrieval to cause three different actions of a fish swimming through the water and further causing a nosedive action to a deeper depth when the line is slackened during retrieval.

15. The method of simulating different actions of the fish of claim 14 in which said lure is retrieved at a slow speed to provide a sinusoidal path of retrieval with the upper tail portion oscillating at a slow frequency in a wide arc.

16. The method of simulating different actions of the fish of claim 14 in which the lure is retrieved at an intermediate speed to provide a pronounced zigzag path through the water with the upper tail portion oscillating at a moderate frequency in an arc which is smaller than at the slow speed of retrieval.

17. The method of simulating different actions of the fish of claim 14 in which the lure is retrieved at a fast speed of retrieval to provide a fast wiggling path through the water with the upper tail portion oscillating at a higher frequency in an arc which is smaller than the arc at the moderate speed of retrieval.

* * * * *